Aug. 8, 1939.   R. D. BROUWER   2,168,469
ANTIFRICTION BEARING
Filed April 29, 1936

INVENTOR:
RODGER D BROUWER,
BY Gales P. Moore
HIS ATTORNEY.

Patented Aug. 8, 1939

2,168,469

UNITED STATES PATENT OFFICE 2,168,469

ANTIFRICTION BEARING

Rodger D. Brouwer, Bristol, Conn., assignor to General Motors Corporation, Detroit, Mich., a corporation of Delaware Application April 29, 1936, Serial No. 77,007

11 Claims. (Cl. 308—236)

This invention relates to antifriction bearings and comprises all of the features of novelty herein disclosed. An object of the invention is to provide improved means for securing a bearing race ring on a shaft or the like. Another object is to provide a unit handling race ring and securing means which will operate to force an overhanging or displaceable portion of the race ring into firm gripping contact with a supporting member.

To these ends and also to improve generally upon devices of this character the invention consists in the various matters hereinafter described and claimed. In its broader aspects the invention is not necessarily limited to the specific forms selected for illustrative purposes in the accompanying drawing in which Fig. 1 is an axial sectional view of a bearing having the improved securing means.

Figure 7:
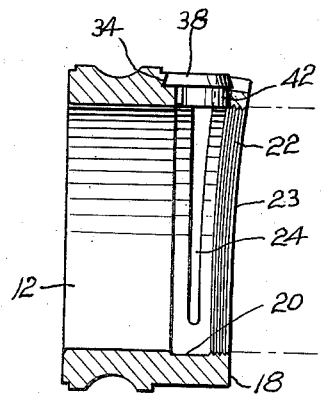
Fig. 7 is a sectional view with the wedging means in a different position from that of Fig. 1 and operating to secure the race ring on a shaft.

The numeral 10 indicates the outer race ring of a bearing having an inner race ring 12 and rolling elements 14. The rolling elements are herein shown as balls spaced apart by a separator 16 and the ends of the bearing may be closed in any suitable way as by shields 17. This is only illustrative of a suitable bearing to which the invention may be applied. The inner race ring has a load carrying raceway portion and an extension 18 at one end, this extension being internally grooved or recessed at 20 just inside of a series of inwardly projecting teeth or ribs 22 which are substantially of the same diameter as the bore of the race ring. A portion 23 of the extension 18 is made displaceable by an arcuate slot 24 which preferably extends angularly around the greater portion of the periphery of the ring so that by tilting or wedging the overhanging portion 23 at the outer side of the slot away from the body of the race ring, the ribs 22 will be caused to bite into a shaft or other holding member on which the race ring is fitted as indicated in Fig. 7.

Figure 1:
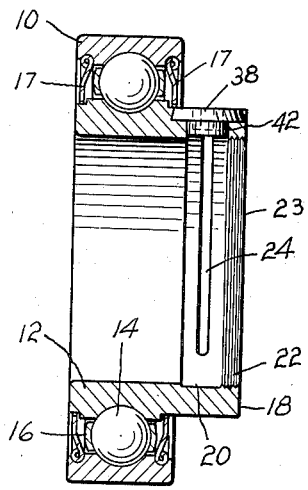
Figure 2:
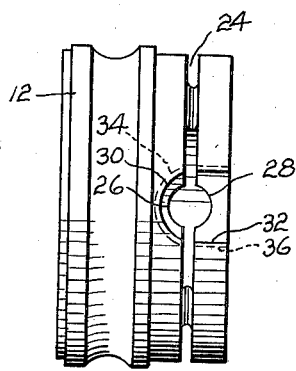
Fig. 2 is a radial view of an inner race ring, the wedging means being removed.
Figure 3:
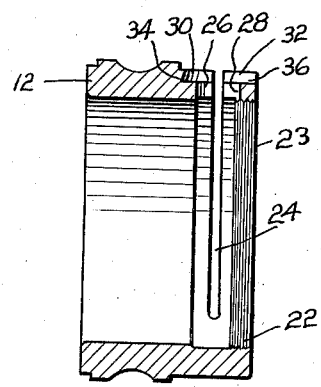
Fig. 3 is a cross sectional view of the race ring of Fig. 2.
Figure 4:
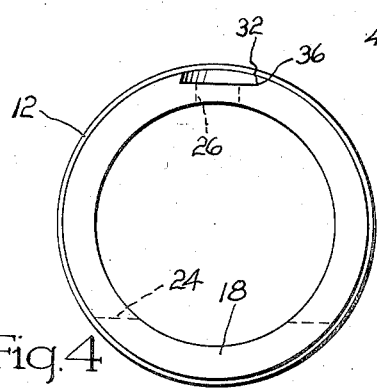
Fig. 4 is an end view of the race ring.
Figure 5:
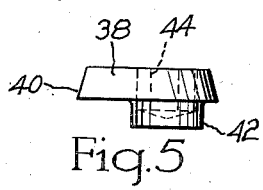
Fig. 5 is a side view of the wedging means enlarged.
Figure 6:
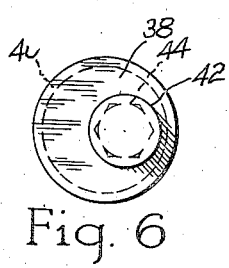
Fig. 6 is a bottom plan view of Fig. 5.

Extending radially from the groove 20 at the middle of the slot 24 is an opening formed by curved walls 26 and 28, this opening leading to a notch formed by a curved recess 30 in the body of the ring and by a straight recess 32 in the overhanging portion 23. The recess 30 is undercut at 34 and the recess 32 is undercut at 36. Fitting in the recess 30 and extending part way into the recess 32 is a rotatable wedge or cam comprising a round head 38 with a bevelled edge 40 adapted to fit the undercut surface 34. A round stud or projection 42 is formed on the cam eccentric thereto and is adapted to fit in the opening formed by the curved walls 26 and 28 and by the intersecting slot 24. The cam is held from coming off the race ring axially by the projection 42 and is held from radial movement by the bevelled surfaces. The cam is inserted in the recesses radially when the overhanging portion 23 is temporarily displaced or tilted outwardly by a suitable tool. The resilience in the parts thereafter holds them together as a unit handling structure. A socket 44 in the cam provides for rotating it with a suitable tool from the substantially neutral position shown in Fig. 1 to a position in which the overhanging portion 23 is wedged or tilted away from the body of the ring to cause the teeth 22 to grip a shaft indicated by broken lines in Fig. 7.

Figure 8:
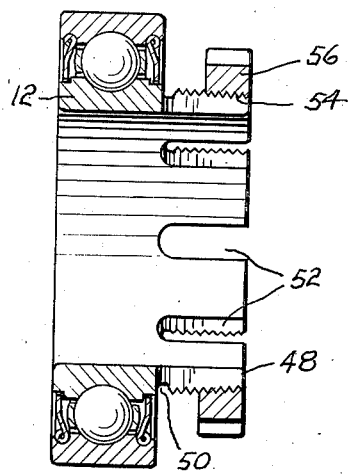
Fig. 8 is an axial sectional view of a modification.

In the modification of Fig. 8, an extension 48 of the race ring is rendered displaceable by a peripheral recess or groove 50 and by a series of axial slots 52 extending from the end of the extension to intersect the groove. The extension is externally tapered and provided with pipe threads 54 to receive a nut 56 which, when screwed inwardly, will contract the extension and cause it to grip a shaft. The shaft may fit the bore in the body of the race ring or have a slight clearance therewith.

I claim:

1. In a unit-handling antifriction bearing and securing means, a race ring adapted for connection to a supporting member, the race ring having a load carrying raceway portion and a portion overhanging laterally beyond the raceway portion of the ring and displaceable with respect thereto, the ring having a bore opening to slide axially onto the supporting member, and means reacting between the overhanging portion and the raceway portion and free of the supporting member for forcing said displaceable portion to contract into tight engagement with the periphery of the supporting member; substantially as described.

2. In a unit-handling antifriction bearing and securing means, a race ring having a load carrying raceway portion and an overhanging displaceable portion spaced laterally from the raceway portion, the ring having a bore opening to slide axially onto a smooth supporting member and means for tilting said overhanging portion laterally and inwardly into tight engagement with the periphery of the supporting member; substantially as described.

3. In a unit-handling antifriction bearing and securing means, a race ring having a load carrying raceway portion and an overhanging portion spaced laterally from the raceway portion by a slot extending angularly thereof, the ring having a bore opening to slide axially onto a smooth supporting member, and means acting to widen the slot to cause the overhanging portion to contract into tight engagement with the periphery of the supporting member; substantially as described.

4. In a unit-handling antifriction bearing and securing means, a race ring having a load carrying raceway portion and an overhanging portion spaced laterally from the raceway portion by an arcuate slot, the ring having a bore opening to slide axially onto a smooth supporting member, and a cam reacting between the raceway portion and the overhanging portion to force the latter to contract into tight engagement with the periphery of the supporting member; substantially as described.

5. In a unit-handling antifriction bearing and securing means, a race ring having a load carrying raceway portion and an overhanging portion spaced laterally from the raceway portion by an arcuate slot, and a cam inserted between said portions for forcing said overhanging portion laterally away from the raceway portion; substantially as described.

6. In a unit-handling antifriction bearing and securing means, a race ring having a load carrying raceway portion and an overhanging displaceable portion spaced laterally from the raceway portion, an eccentric member inserted between said portions and having a surface engaging the raceway portion and a surface engaging the overhanging portion, and means for turning said eccentric member; substantially as described.

7. In an antifriction bearing, a race ring having a radial opening and an overhanging portion spaced laterally from the ring, and a wedging member having a stud in said opening and a head engaging the ring, the stud and head being eccentric to one another; substantially as described.

8. In an antifriction bearing, a race ring having an overhanging portion spaced laterally from the ring by an arcuate slot, the ring having a notch adjacent to the slot, a wedging member having a head engaging said notch, and the member having a stud eccentric to the head and engaging the overhanging portion; substantially as described.

9. In an antifriction bearing, a race ring having an overhanging portion spaced laterally from the ring by an arcuate slot, the ring having a notch adjacent to the slot and an opening leading to the notch, and a wedging member having a head engaging said notch and a stud entering said opening; substantially as described.

10. In an antifriction bearing, a race ring having an overhanging portion spaced laterally from the ring by an arcuate slot, the ring having an undercut notch adjacent to the slot and an opening leading to the notch, a wedging member having a bevelled head engaging the notch, and a stud projecting from the wedging member into the opening; substantially as described.

11. In a unit-handling antifriction bearing and securing means, a race ring having a load carrying raceway portion and an axial extension of smaller size, the extension having a slot with relatively displaceable portions on opposite sides of the slot, the raceway portion and the extension having a bore opening to slide onto a smooth supporting shaft, and a wedging member reacting between said relatively displaceable portions to widen the slot and thereby contract the outer portion of the extension upon the periphery of the shaft; substantially as described.

RODGER D. BROUWER.